SHIELDED RESILIENT BOOT FOR ELECTRIC SWITCHES

Filed March 18, 1965

INVENTORS.
ARTHUR J. JOHNSON
WILLEM F. BAKKER
BY
Bierman + Bierman
ATTORNEYS

3,487,186
SHIELDED RESILIENT BOOT FOR ELECTRIC SWITCHES

Arthur J. Johnson, Montclair, and Willem F. Bakker, Clark, N.J., assignors to Metex Corporation, a corporation of Delaware Filed Mar. 18, 1965, Ser. No. 440,884
Int. Cl. H01h 9/02
U.S. Cl. 200—168 6 Claims

ABSTRACT OF THE DISCLOSURE

A radio frequency shielding device comprising a fabric shield consisting of a sheet of flexible and stretchable material having therein a flexible and stretchable metal mesh.

The present invention is directed to shielding devices for electromagnetic waves, more particularly for suppressing radio frequency interference.

Most electronic devices are covered by or contained in metal housings, boxes or other coverings. Such electronic devices contain apparatus which give rise to radio interference, including relays, make-and-break contactors and various types of tubes and other elements. When the radio interference waves egress, they usually cause serious troubles or dislocations to nearby electronic equipment and become a nuisance in the vicinity. Another important factor is that, in a housing containing electronic equipment, there are numerous items that are capable of being serious and adversely affected by the ingress of radio interference waves coming from outside sources.

In the case of such elements, as switches, which have extending parts which are operated from outside the housing, it was necessary, in prior shielding devices, to provide openings in the metal of the housing, which allowed both ingress and egress of interfering waves. If the openings were filled with non-conducting material, there was no protection against such waves. If the openings were filled with metals, the interference would be increased unless the metal was well grounded, which was difficult to provide and such grounding introduced complications in the structures and added expense.

The present invention has among its objects to overcome the difficulties and disadvantages inherent in the suppression of radio interference, it being among the object of the invention to provide a simple, inexpensive and highly efficient shield.

It is also among the objects of the invention to prevent the ingress and egress of radio interference thru openings or holes in the housings of electronic equipment, thru which switch operating means, such as toggles, rods, stems and other control elements protrude, in such a manner so as to be readily accessible.

It is further among the objects of the invention to provide a fabric material of simple construction which will be adapted for obtaining the desired effects.

In practicing the present invention, there is provided a fabric which has as its basic central element an open mesh material of suitable conductive metal. The mesh is both flexible and stretchable so that it may be readily molded or formed to various shapes. The metal mesh is enclose in the central portion of a sheet of flexible and stretchable material, such as natural or synthetic rubber. In effect, the mesh is encapsulated within the central portion of the stretchable material which is on either side thereof.

The most preferred mesh is made of linked wires and is preferably of knitted structure. The wires have a diameter of about .0005 to .008", and preferred range is about .0035" to .0045". The mesh has about 5 to 30 courses per inch of length, and the preferred range is about 15 to 20 courses. Also, the mesh has about 5 to 20 needle loops per inch of width and preferably about 10 to 15 needle loops per inch of width.

Usually the shielding fabric is cornucopic or conical in shape for covering and shielding toggle and other switches and it is closed at the outer end. The inner end is grounded to the housing or support. When it is desired to shield around remote control rods or stems, the conical end is open to allow said rod or stem to project thru, but the mesh fabric is sufficiently close to such rod or stem so as to practically contact it, whereby there is obtained a good grounding thereof.

In such structures which have control buttons which are rotatable over not more than 180°, the shield covers the entire button and the button is rotatable thru the stretchable or elastic shield by grasping and operating the shield. Such a shield has a long life and is not subject to fatigue difficulties. In all cases, the metal fabric should be well grounded to the rigid metal member, which is itself grounded to the housing.

The invention is more fully described in connection with the accompanying drawings constituting a part hereof; in which like reference characters indicate like parts, and in which—

Figure 1:
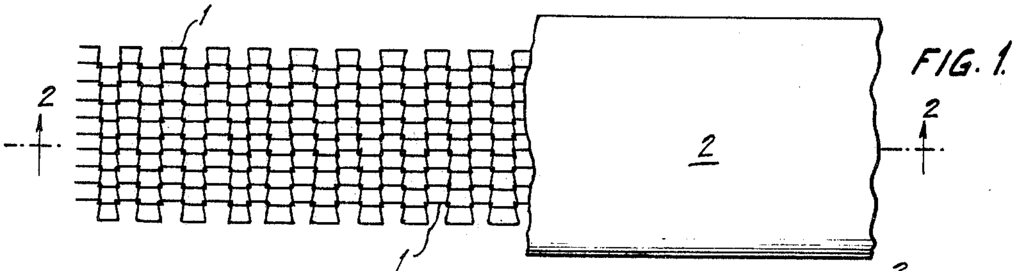
FIG. 1 is a plan view of a fragmentary portion of a sheet of mesh fabric, some parts being broken away for clearness.
Figure 2:
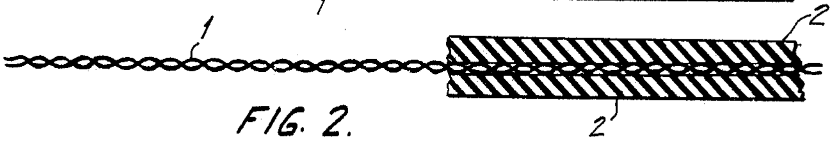
FIG. 2 is a transverse cross-sectional view of the basic mesh fabric taken along line 2—2 of FIG. 1.

Referring to FIGS. 1 and 2, there is provided a metal mesh 1 of linked wires, in the form of a sheet. It is enclosed in a sheet 2 of rubber or other flexible and elastic material to form a laminate. The consistency is such that it may be readily distorted, shaped or formed and it will retain such form. Preferably, the mesh is in the center of the laminate.

Figure 3:
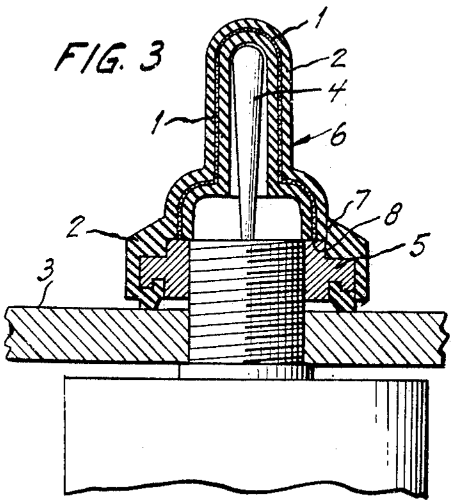
FIG. 3 is a vertical cross-sectional view of a toggle switch with a bat handle and shielded as described herein.

In FIG. 3 is shown a toggle switch mounted in housing 3. It has a bat handle 4 extending upward from the body 5 of the switch. The shield 6 of the aforesaid laminate is formed around the handle, is fitted at 7 around the body of the switch, and terminates at 8 between metal housing 3 and body 5, the covering 2 being stripped from mesh 1 to permit a firm gripping of the mesh against the housing. To operate the switch the top of the shield is grasped by the fingers to give firm contact with handle 4, whereby it may be turned or flipped in any direction over practically 360°.

Figure 4:
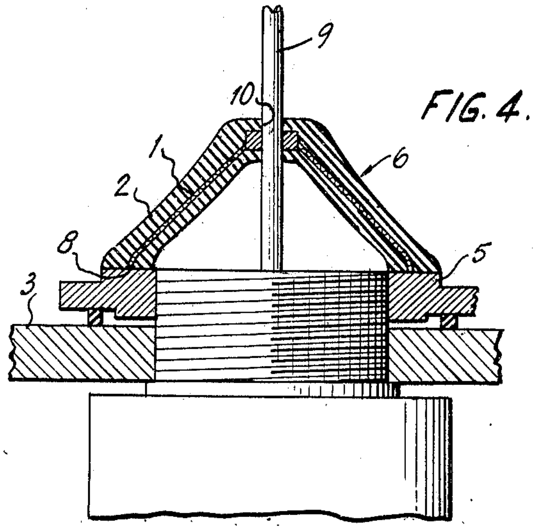
FIG. 4 is a vertical cross-sectional view of a switch having a control rod or stem and shielded as described herein.

FIG. 4 illustrates the shielding of a switch having a remote control rod or stem 9. An opening is made in the conical top of shield 6 and mesh 1 is made to contact the face of control rod 9 at 10. The open end of shield 6 is grounded as desired at 8. Control rod 9 is operated by rotation thereof any number of turns.

Figure 5:
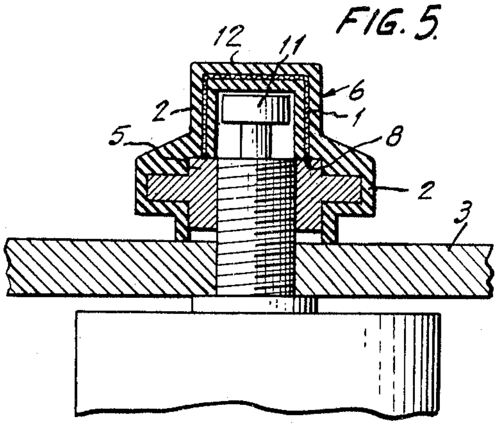
FIG. 5 is a vertical cross-sectional view of a push-pull button switch shielded in accordance with the invention.

In FIG. 5 is shown a push button type of switch which is completely enclosed by shield 6. It has a button 11 having a flat top. The fabric is so formed that the top 12 of the shield 6 is also flat and in contact with the top of the button. By pressing at 12 the button is pushed down and makes or breaks contact depending on the character of the circuit being controlled.

Although the invention has been described setting forth a few specific applications thereof, the examples are intended to illustrate the nature of the invention but not to limit it. Many other pieces of equipment are adaptable for shielding in accordance with the principles set forth herein. For instance, the switch of FIG. 5 may be a push-pull type and may be rotatable over 180° or more. Other types of switches are adaptable to the invention. Also, various other devices which have parts which are movable for operation outside of the housing, are contemplated as part of the invention, even though they may not be strictly classed as switches. In the appended claims, the term "switch" is intended to embrace such devices. The mesh element need not be made flat and then bent to shape, but various forms thereof, depending on the shape of the item to be shielded, may be preformed. It is not essential that rubber be used as there are synthetic resinous substances which have the desired flexibility and stretchability for the present use. The equipment to be so enclosed may take various forms and be totally different in configuration from those shown in the drawing. If the mesh element is too stiff, one of the layers of stretchable and flexible material may be wholly or partially eliminated.

What is claimed is:

1. A radio frequency shielding device which comprises a switch having an operating means extending therefrom, a shield of a fabric, said fabric being a sheet of flexible and stretchable material having therein a flexible and stretchable metal mesh, said fabric fitting closely around said operating means and substantially isolating said switch from the air, said mesh being grounded, whereby said device impedes the ingress or egress of radio frequency interference waves, said mesh being of knitted wire having a diameter of about .0005 inch to .008 inch.

2. A shielding device according to claim 1 characterized in that said wire has a diameter of about .0035" to .0045".

3. A radio frequency shielding device which comprises a switch having an operating means extending therefrom, a shield of a fabric, said fabric being a sheet of flexible and stretchable material having therein a flexible and stretchable metal mesh, said fabric fitting closely around said operating means and substantially isolating said switch from the air, said mesh being grounded, whereby said device impedes the ingress or egress of radio frequency interference waves, said mesh being of knitted wire, said mesh having about 5 to about 30 courses per inch of length.

4. A shielding device according to claim 3 characterized in that said mesh has about 10 to 20 courses per inch of length.

5. A radio frequency shielding device which comprises a switch having an operating means extending therefrom, a shield of a fabric, said fabric being a sheet of flexible and stretchable material having therein a flexible and stretchable metal mesh, said fabric fitting closely around said operating means and substantially isolating said switch from the air, said mesh being grounded, whereby said device impedes the ingress or egress of radio freqeuncy interference waves, said mesh being of knitted wire, said mesh having about 5 to 20 needle loops per inch of width.

6. A shielding device according to claim 5 characterized in that said mesh has about 10 to 15 needle loops per inch of width.

References Cited

UNITED STATES PATENTS 2,795,144 6/1957 Morse ---------- 200—168 X

FOREIGN PATENTS 636,210 1/1928 France.

HERMAN O. JONES, Primary Examiner

U.S. Cl. X.R.

174—35